UNITED STATES PATENT OFFICE.

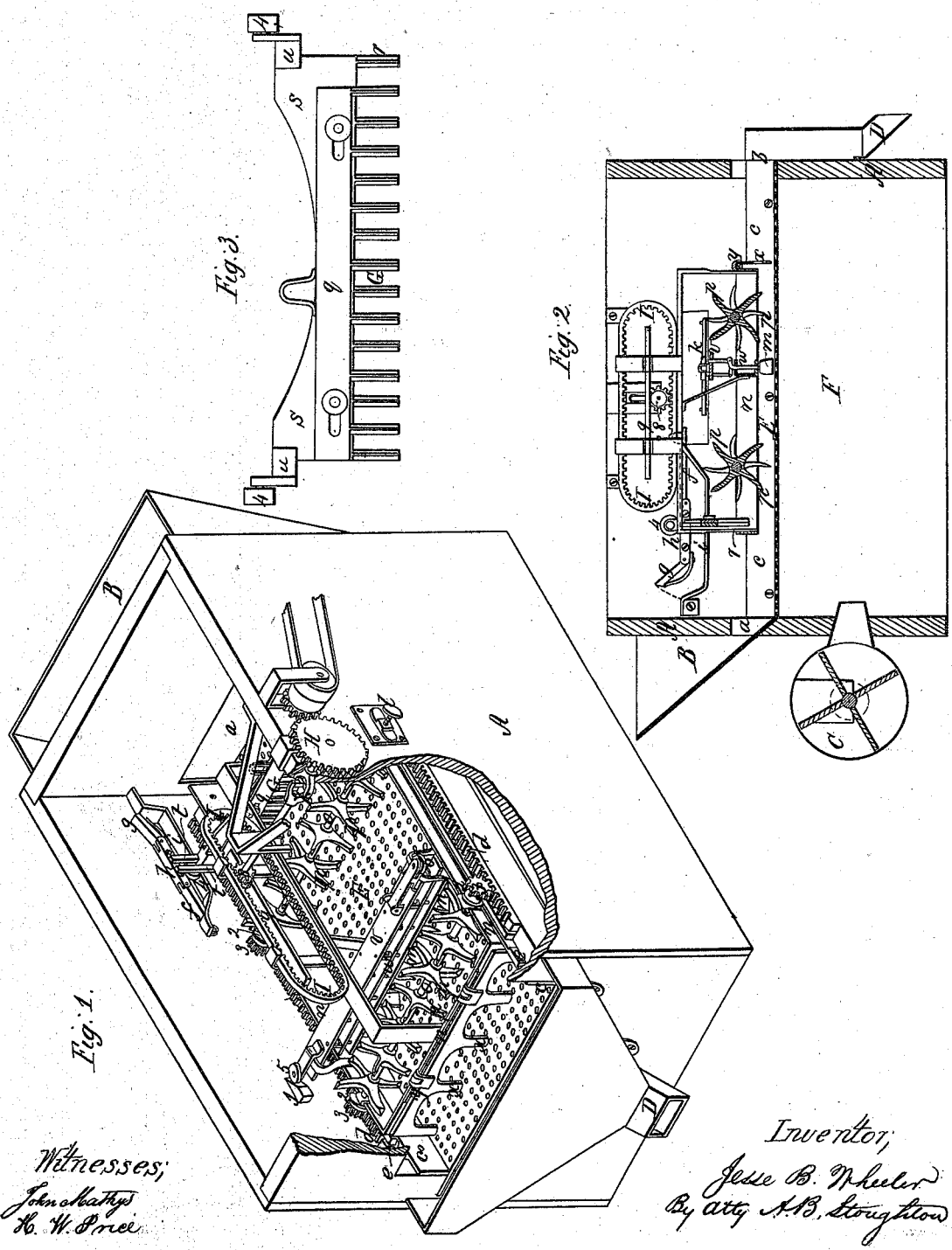

JESSE B. WHEELER, OF BOLTON, MASSACHUSETTS.

IMPROVEMENT IN STIRRING, CONVEYING, AND COOLING GRAIN.

Specification forming part of Letters Patent No. 35,271, dated May 13, 1862.

*To all whom it may concern:*

Be it known that I, JESSE B. WHEELER, of Bolton, in the county of Worcester and State of Massachusetts, have invented a new and useful Improvement in Machines for Conveying and Cooling, or for Conveying, Drying, and Cooling Grain; and I do hereby declare that the following is a full, clear, and exact description of the same, reference being had to the accompanying drawings, making a part of this specification, in which—

Figure 1 represents a perspective view of the machine, with a portion of the sides broken away to represent or show the interior mechanism. Fig. 2 represents a longitudinal vertical section through the same, and Fig. 3 represents a portion of the conveying and stirring apparatus not distinctly seen in the other figures.

Similar letters of reference where they occur in the several figures denote like parts of the machine in all the drawings.

The object and purpose of my invention is to convey and cool, or to convey, dry, and cool grain as it is stirred and passed through the machine; and it consists in a reciprocating carriage furnished with stirrers and conveyers which automatically traverse over a perforated bottom through which cool or heated air or alternate cool and heated air is driven or passes, said stirrers and conveyers being so arranged and operated as that they will not drag back any of the grain, but completely move the whole of it while it is moved along over the perforated bottom from the inlet to the exit.

To enable others skilled in the art to make and use my invention, I will proceed to describe the same with reference to the drawings.

A represents a case or frame having a hopper, B, and a fan and fan-case, C, arranged at one of its ends, and an exit or delivery spout, D, at its other end. At or about the center of the case A there is a perforated diaphragm or partition, E, under which there is an air-chamber, F, and above which the conveying and stirring mechanism is arranged. The grain from the hopper passes in at $a$ onto this perforated or meshed bottom, and after it is stirred and advanced over it will run off at $b$ into the conducting-spout D, from whence it may be conducted to any desired place.

On the sides of the chamber above the perforated bottom E are arranged side plates, $c$, to keep the grain from crowding the sides of the chamber, and behind these plates $c$ are stationary racks $d$ and rails $e$ for operating the rotating stirrers and for supporting the carriage or frame that contains them, as will be hereinafter explained.

At the rear end of the chamber (calling that end the rear end where the grain is introduced) and upon the sides thereof are arranged switches $f g$ and ways $h i$ for raising, lowering, and sustaining the rear section of stirrers, or, rather, conveyers, G, Figs. 1 and 3; and toward the forward end of the chamber (calling that the forward end where the grain is passed out of the machine) and upon the sides thereof are placed a permanent cam-plane, $j$, Fig. 1, and directly opposite to it an adjustable cam-plane, $k$, Fig. 2, which latter is adjusted from the outside by means of a set-screw, $l$, Fig. 1, for the purpose of turning the blades $m$ of the conveyer at the forward part of the carriage first, so that they will not drag back the grain, and afterward that they may be turned to push it forward.

The racks and ways $d e$ are made adjustable by set-screws, so that the carriage carrying the stirrers and conveyers may be elevated or depressed to suit the quantity of grain that is to be passed through the machine.

The foregoing description embraces generally the case, frame, or box A and those parts of the machine that are united to the frame or case, which may be termed the "passive" parts of the apparatus. I will now proceed to describe the more active parts, their arrangement, and operation.

$n$ is a carriage supported upon the axles $o o$, one at or near each of its ends. Upon these axles $o o$ near to their ends are small wheels 2, which run upon the ways $e$, and upon their extreme ends are pinions 3, that run in the racks $d$, and thus rotate said axles $o o$. The axles $o o$ are furnished with stirrers $p$, which are spread out at their ends and may incline in contrary directions upon the axles, so as to pass over or through the entire mass of grain, leaving none that has not been moved.

At the rear of the carriage is a conveyer, G, Fig. 3. It has one set of teeth, $r$, fixed, and a second set connected to a plate, $q$, that is made adjustable on the main plate $s$, so that more or less of the space between the fixed teeth may be opened or closed, as it may be desirable to move the grain slower or faster. It will be perceived that this conveyer G moves back and forth with the carriage n, and it is obvious that unless some means of preventing it from pushing the grain backward when it goes back is adopted it would not act as a conveyer. I arrange it as follows: On the carriage are uprights t, between which the arms u of this conveyer pass, and on the extremities of these arms are friction-rollers 4, which, as the conveyer goes back, run over the switches f g and way h and hold the teeth up above the grain; but when the conveyer is moved forward (the switch g having been thrown upward or open by its spring) the rolls 4 pass under g and down by the ways i, bringing its teeth down into the grain, and thus moving the grain along with them. This conveyer then, besides its forward-and-backward motion, has a rising-and-falling motion, and is, moreover, adjustable laterally. Forward of this conveyer in the carriage comes one of the rotary stirrers on the axle o; and in front of this rotary stirrer there is a section of blades m set in two plates, one of which is movable endwise, so that these blades may be turned first oblique, to carry forward the grain, and then square or parallel to its line of motion, so as to pass through the grain without dragging it back. These blades m have crank-handles, as shown in Fig. 2, for the purpose of turning them to the right and left by the shifting of one of the plates, v, the other, w, being stationary on the carriage. When in the forward movement of the carriage and at about the end of its movement the plate v, which has a friction-roll, 5, on one of its ends, strikes against the cam j, the plate is forced endwise, which turns the blades m, so that they will pass back through the grain without dragging back the grain with them, and when the carriage arrives at pretty near the end of its backward traverse a friction-roll, 6, on the other end of the movable plate v, running up over and dropping off, strikes against the adjustable cam k, which sets the blades m oblique to their line of motion, every other one alternately to the right and left, so that in going forward they shall carry forward the grain in regulated quantities without piling it up in one place more than another, while the whole mass is constantly agitated and turned over in its passage over the perforated bottom E.

In front of the blades m is a second rotary stirrer, the counterpart of the one above described. These rotary stirrers revolve always in the direction in which the carriage is moving for the time being, whether that movement be forward or backward.

The extreme front of the carriage is furnished with a conveyer and stirrer, x, that is hinged to the carriage at y. When the carriage goes forward, this conveyer and stirrer x is active in its operation; but as the carriage returns back the teeth swing upon the surface of the grain and pass back without dragging back the grain with them.

The carriage is driven as follows: The cogwheel H is moved by any suitable power and by any common mode of gearing, and is on a shaft that has a toggle-joint, 7, in it, the farther end of said shaft carrying a pinion, 8, that runs in a change-rack, I, that is connected to the carriage n, so that as the pinion 8 traverses the change-rack I it will give a reciprocating motion to said carriage, causing the several parts and connections thereto to move, as above described. To keep the pinion 8 in gear with the change-rack, there is a plate or way, 9, affixed to the rack, on which a friction roll on the end of the toggle-joint shaft runs, keeping the pinion in mesh without allowing it to bind or run out of gear. The object of the toggle-joint is that the pinion may traverse the rack freely and be accommodated to the carriage when it is raised up or let down to adjust it to the depth of grain on the perforated bottom E, and to insure its thorough stirring while it is advanced over it and while it is subjected to a current of cool air or heated air, or alternate currents of heated and cool air, as the condition of the grain may require.

Having thus fully described the construction and operation of my proposed grain drier, stirrer, cooler, and conveyer, what I claim therein as new is—

1. In combination with a perforated bottom through which air is driven by a fan, a reciprocating carriage which carries a series of conveyers and revolving stirrers that move and turn over the grain as it is being advanced over said perforated bottom, substantially as described.

2. In combination with a reciprocating carriage, the conveyer G, which has in addition to its forward-and-backward movement a rising-and-falling movement, substantially in the manner and for the purpose set forth.

3. In connection with a reciprocating carriage, a section of conveyers composed of blades m, that are moved laterally by the cams j and k, in the manner and for the purpose set forth.

4. In connection with a reciprocating carriage, the hinged conveyer and stirrer x, that acts while the carriage goes forward and swings up out of the grain when the carriage moves backward, for the purpose substantially as herein set forth.

JESSE B. WHEELER.

Witnesses:
 REUBEN STONE,
 I. R. BACON.